United States Patent
Ito

(10) Patent No.: US 7,159,991 B2
(45) Date of Patent: Jan. 9, 2007

(54) PROJECTION TYPE IMAGE DISPLAY DEVICE

(75) Inventor: Masaki Ito, Saitama (JP)

(73) Assignee: Fujinon Corporation, Saitama (JP)

( * ) Notice: Subject to any disclaimer, the term of this patent is extended or adjusted under 35 U.S.C. 154(b) by 177 days.

(21) Appl. No.: 11/036,134

(22) Filed: Jan. 18, 2005

(65) Prior Publication Data

US 2005/0157266 A1    Jul. 21, 2005

(30) Foreign Application Priority Data

Jan. 20, 2004   (JP)  .............................. 2004-012406

(51) Int. Cl.
*G03B 21/14* (2006.01)
(52) U.S. Cl. ............................ 353/98; 353/122; 349/5; 385/901
(58) Field of Classification Search .................. 353/98, 353/94, 122; 385/133, 901; 349/5, 7, 8, 349/9
See application file for complete search history.

(56) References Cited

U.S. PATENT DOCUMENTS 6,843,591 B1 * 1/2005 Peng et al. .................. 362/560
7,090,357 B1 * 8/2006 Magarill et al. ............... 353/94
2004/0233679 A1 * 11/2004 Ferri et al. ................... 362/551
2005/0135761 A1 * 6/2005 Cannon et al. ............. 385/125

FOREIGN PATENT DOCUMENTS

| JP | 2003-16802 | 1/2003 |
|----|-----------|--------|
| JP | 2003-59303 | 2/2003 |

* cited by examiner

*Primary Examiner*—William C. Dowling
(74) *Attorney, Agent, or Firm*—Arnold International; Bruce Y. Arnold

(57) ABSTRACT

A rod integrator, which has a light incident face and a light exit face, inclines its axis at a predetermined angle with respect to a light emitting direction of a light source. The light incident face is a inclined plane with respect to an axial direction of the rod integrator and deflects the incident light in the axial direction. The light exit face is in parallel with the light incident face and deflects the exit light in a parallel direction to the light emitting direction of the light source. These deflections at the light incident and exit faces bend a light axis of the light.

8 Claims, 4 Drawing Sheets

PROJECTION TYPE IMAGE DISPLAY DEVICE

BACKGROUND OF THE INVENTION

1. Field of the Invention

The present invention relates to the field of projection type image display devices. More specifically, it relates to a projection type image display device having a rod integrator which equalizes illuminance of illumination light from a light source.

2. Background Arts

One of projection type image display devices known in the art is a projector which has an image generating section such as a liquid crystal element or a digital micromirror device (DMD) In this kind of projector, the image generating section modulates illumination light from a light source to an image light. Subsequently, the image light is projected on a screen through a projection optical system.

Because the illumination light from the light source might be uneven in illuminance, two Japanese patent laid-open publications No. 2003-16802 and No. 2003-59303 disclose a bar of rod integrator arranged between the light source and the image generating section. The rod integrator, for instance, is made of glass and it's one end along the axial direction is made into a light incident face while the other end is into a light exit face. The illumination light entered from the light incident face is equalized by reflecting on an inner surface of the rod integrator, then exits from the light exit face.

For using the space inside a housing effectively to downsize the projector, it would be better not to align the light source with the image generating section. Therefore, it is conventional to provide a mirror somewhere in between the light source and the image generating section to bend the light axis of the illumination light toward the image generating section.

A problem lies in the device described above that the number of components must be increased. The device also leads to the increased production cost because a component for precisely holding the mirror is required.

SUMMARY OF THE INVENTION

In view of the foregoing, a primary object of the present invention is to provide a projection type image display device with simple structure which is able to bend a light axis of illumination light.

Another object of the present invention is to provide a projection type image display device which is able to use a space inside a housing effectively.

To achieve the above objects and other objects, a projection type image display device of the present invention comprises a light source for emitting illumination light, an image generating section for modulating the illumination light to an image light, a rod integrator elongated in an axial direction which has a light incident face and a light exit face at both ends in the axial direction.

The rod integrator equalizes the illumination light entering from the light incident face with a total internal reflection, then emits the illumination light from the fight exit face. At least one of the light incident face and the light exit face is an inclined plane with respect to the axial direction so as to bend a light axis of the illumination light crossing the inclined plane. The light axis of the illumination light inside the rod integrator coincides with the axial direction of the rod integrator.

Alternatively, both of the light incident face and the light exit face are inclined planes to bend the light axis of the illumination light. In this case, the light incident face and the light exit face are in parallel with each other.

According to the present invention, it is possible to bend the light axis of the illumination light without increasing the number of components so that the device can be downsized and the production cost can be reduced. Further, it is possible to offer greater flexibility for unit layout so that the space inside the housing can be used effectively.

BRIEF DESCRIPTION OF THE DRAWINGS

The foregoing and other features and advantages of the present invention will become apparent from the following detailed descriptions of the preferred embodiments in conjunction with the accompanying drawings, which are given by way of illustration only and thus do not limit the present invention. In the drawings, the same reference numerals designate like or corresponding parts throughout the several views, and wherein.

DESCRIPTION OF THE PREFFERED EMBODIMENTS

Figure 1:
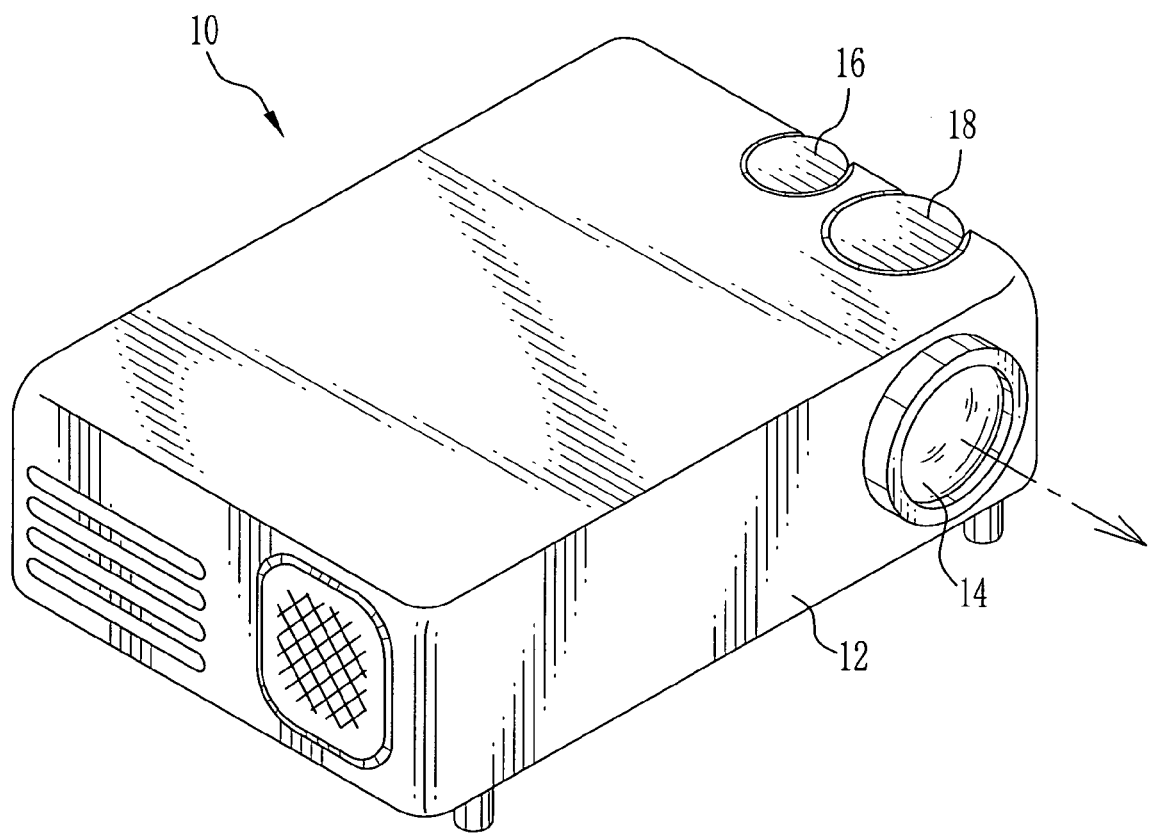
FIG. 1 is an external view illustrating an appearance of a projector according to the present invention.

Referring now to FIG. 1, a projector 10 exposes a projection lens 14 formed on a foreside of a housing 12 when a lens cover is removed. A screen (not shown) is set ahead of the projection lens 14 and an image from the projection lens 14 is projected on it. The housing 12 is provided with a zooming dial 16 and a focusing dial 18 for varing the magnification and adjusting the focus of the projection lens 14.

Figure 2:
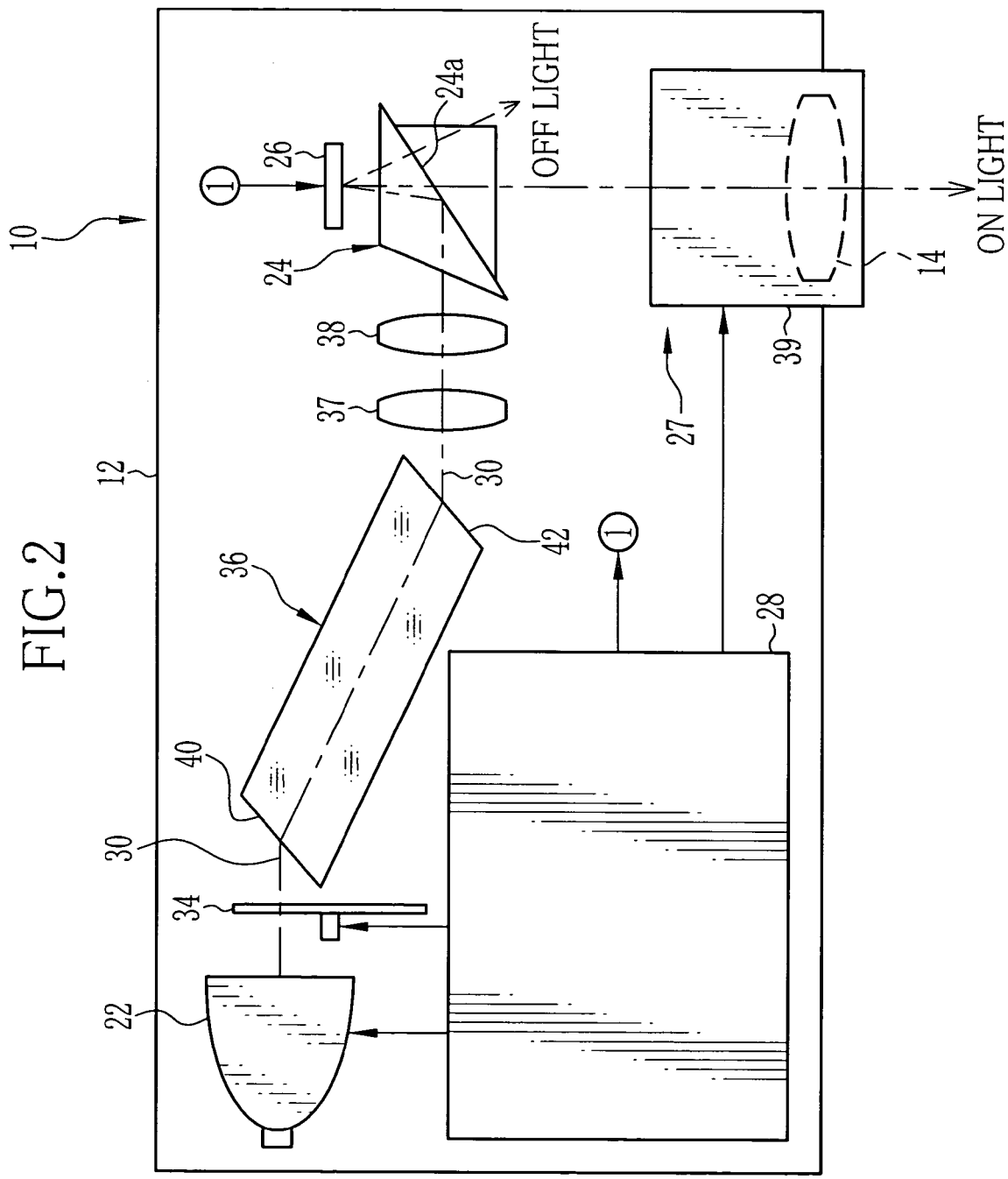
FIG. 2 is a block diagram illustrating a structure of the projector.

As shown in FIG. 2, the housing 12 contains a light source 22, an illumination optical system, a total reflection prism 24, a DMD 26, and a projection optical system 27. The housing 12 also contains a power supply unit 28 which electrifies each component in the projector 10. The power supply unit 28 is disposed in the space which is created by displacing the light source 22 as described later.

The light source 22 will be a white light source such as a xenon lamp or a mercury lamp. The illumination light from the light source 22 travels along a illumination light axis 30 to enter the illumination optical system constituted of a color wheel 34, a rod integrator 36, and relay lenses 37 and 38.

The color wheel 34 is a substantially circular basal plate equipped thereon with a B filter for transmitting only a blue light, a G filter for transmitting only a green light, and a R filter for transmitting only a red light. The color wheel 34 is rotatable and each of the three filters is pitched at an equal distance from a pivot point of the basal plate. When the color wheel 34 rotates at high speed, each filter is inserted sequentially in the illumination light axis 30. This insertion divides the illumination light into three colors of RGB on a time division basis, each of the divided three color lights goes to the DMD 26 in series.

The rod integrator 36 equalizes the divided light from the color wheel 34 so that the light intensity distribution becomes even throughout an acceptance surface of the DMD 26. The relay lenses 37 and 38 relay the light emitted by the rod integrator 36 to the total reflection prism 24.

The total reflection prism 24 is designed to separate an relayed light entering from the relay lenses 37, 38 and a reflection light reflected by the DMD 26. The total reflection prism 24 is constituted of, for instance, two triangular prisms of different refractive index. These prisms form a reflecting surface 24a at their boundary. The relayed light, which enters at a larger angle than a critical angle of the reflecting surface 24a, is totally reflected off to the DMD 26. In contrast, the reflection light, which enters at a smaller angle than the critical angle of the reflecting surface 24a, passes through the reflecting surface 24a.

As is well known, the acceptance surface of the DMD 26 has numerous mirror elements, which correspond to pixels, arranged in a matrix. Each mirror element is mounted swingablly so as to move between an On position to parallel the acceptance surface, and an Off position to tilt with respect to the acceptance surface. In the pixeles which correspond to the mirror element set to the On position, the received light is reflected toward the projection optical system 27 as an On light. In the pixeles which correspond to the mirror element set to the Off position, the received light is reflected to deviate from the projection optical system 27 as an Off light. The On lights toward the projection optical system 27 will constitute the image light.

For simplifing the drawing, the projection optical system 27 is made up with a lens barrel 39 which has the single projection lens 14. But in practice, it is constituted of plural lens groups arranged in the same optical axis and a lens moving mechanism to move these lens groups for zooming and focusing operations. The projection optical system 27 focuses the image light generated by the DMD 26 on the screen.

The general operation of the rod integrator 36 of the present invention is now explained in details. As described above, the rod integrator equalizes illuminance of the illumination light. The rod integrator 36, for instance, is made of transparent glass rod and it's one end in the axial direction is made into a light incident face 40 while the other end is into a light exit face 42. The light entering from the light incident face 40 is overlapped with by a repetition of the internal reflection inside the rod, then exits from the light exit face 42. Thus, luminous of the light beam from the rod integrator 36 can be equalized.

Figure 3:
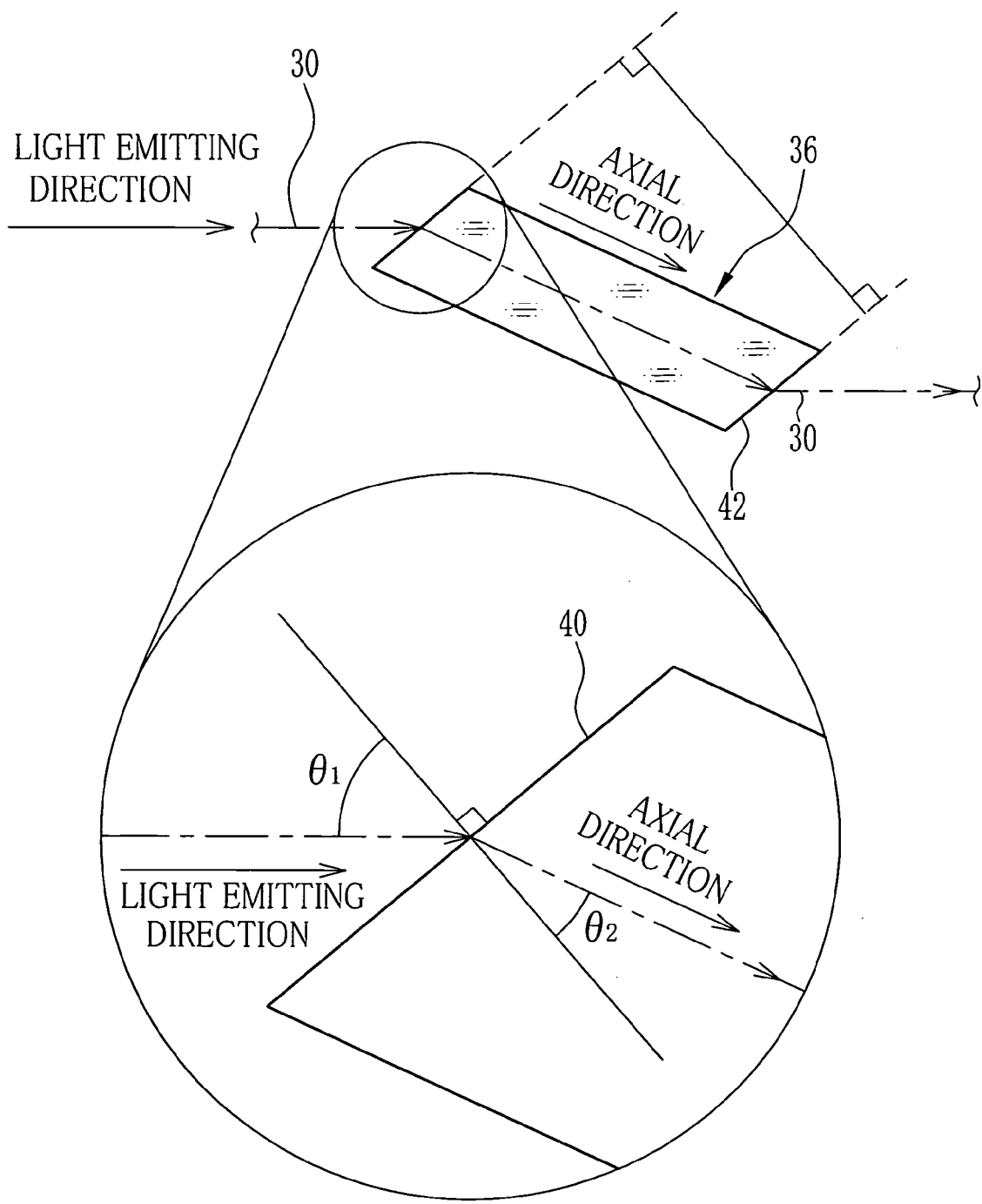
FIG. 3 is an explanatory view illustrating a light axis of illumination light being bent.

The rod integrator 36 is made to bend the illumination light axis 30. Therefore, as described in FIG. 3, the rod integrator 36 is so arranged that its axial direction tilts at a predetermined angle with respect to a light emitting direction of the light source 22. In addition, the light incident face 40 and the light exit face 42 are inclined planes with respect to the axial direction of the rod integrator 36.

In order to deflect the light entering from the light incident face 40 in the axial direction of the rod integrator 36, an arrangement angle of the rod integrator 36 and an inclination of the light incident face 40 are determined to satisfy the following formula;

$$n_1 \sin \theta_1 = n_2 \sin \theta_2$$

Wherein $\theta_1$ represents an incident angle of the light from the light source 22 with respect to the imaginary vertical plane of the light incident face 40, $\theta_2$ represents a refracting angle of the incident light with respect to the imaginary vertical plane of the light incident face 40, $n_1$ represents a refractive index of atmospheric air, and $n_2$ represents the refractive index of the glass which forms the rod integrator 36.

Additionally, the light exit face 42 is formed parallel with the light incident face 40 so that the light from the light exit face 42 proceeds in parallel with the light emitting direction of the light source 22. Briefly, the illumination light from the light source 22 moves in parallel during the passage of the rod integrator 36 because the illumination light axis 30 is bent.

Aligning the light source 22 with the total refrection prism 24 to keep the illumination light axis in a straght line, the light source 22 will overlap into the space for the power supply unit 28. Consequently, the projector 10 bends the illumination light axis 30 by the rod integrator 36 and displaces the light source 22 in a parallel direction to secure the space for the power supply unit 28. It is obvious that the space thus secured can be used for any other component than the power supply unit. The component to be placed there will be determined according to the structure of the projector or the configuration of the housing.

As described above, the projector 10 bends the illumination light axis to provide a flexibility for the components angement, enabling to use the space inside the housing effectively. The illumination light axis is bent by the light incident and exit faces of the rod integrator 36 which deflect the incident and exit lights respectively, there is no need of additional component. This contributes to downsize the device as well as to reduce the production cost. Further, the rod integrator is arranged to tilt with respect to the light emitting direction of the light source 22, the projector can be small in the width direction.

Figure 4A:
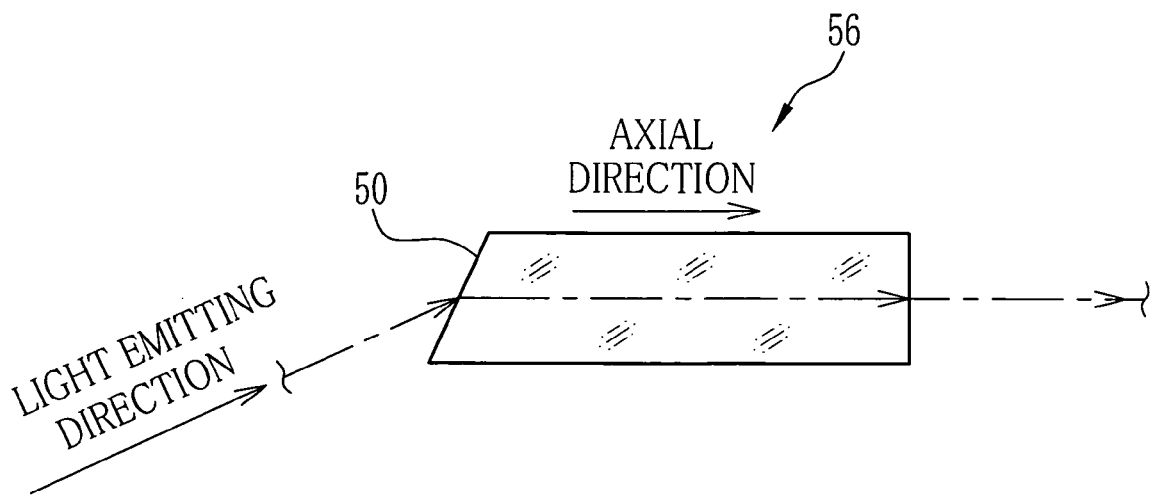
FIG. 4 is an explanatory view illustrating a rod integrator of another embodiment.
Figure 4B:
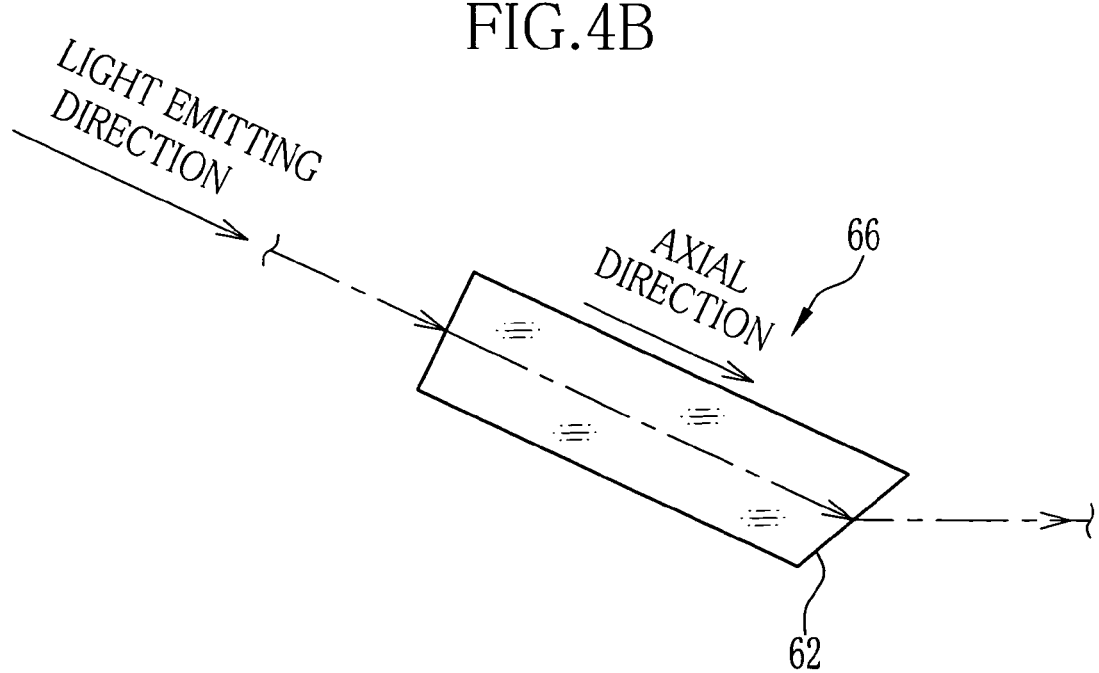

The preferred embodiment is explained with the rod integrator which deflects both the incident and emission lights, this should not be construed as limitation to the present invention. As described in FIG. 4A, for instance, it is possible to deflect only the incident light with a rod integrator 56 in which only a light incident surface 50 tilts with respect to its axial direcrtion. Alternatively, as shown in FIG. 4B, it is also possible to deflect only the exit light with a rod integrator 66 in which only a light exit face 62 tilts with respect to its axial direcrtion. In this way, the design variation of the rod integrator affects on the light source arrangement and thus on the internal state of the housing. Changing the rod integrator design according to the projector structure and the housing configuration will allow more effective use of the space inside the housing.

The above embodiments are described with the projector having the DMD, the present invention is also applicable to a projector which has a liquid crystal element.

As described so far, the present invention is not to be limited to the above embodiments, and all matter contained herein is illustrative and does not limit the scope of the present invention. Thus, obvious modifications may be made within the spirit and scope of the appended claims.

What is claimed is:

1. A projection type image display device comprising:
a light source for emitting illumination light;
an image generating section for modulating said illumination light to an image light; and
a rod integrator elongated in an axial direction, having a light incident face and a light exit face at both ends in said axial direction, said rod integrator equalizing said illumination light entering from said light incident face by a total internal reflection and emitting said illumination light from said light exit face, at least one of said light incident face and said light exit face being an inclined plane with respect to said axial direction so as to bend a light axis of said illumination light crossing said inclined plane.

2. The projection type image display device as claimed in claim 1, wherein said light axis of said illumination light inside said rod integrator coincides with said axial direction of said rod integrator.

3. The projection type image display device as claimed in claim 2, wherein both of said light incident face and said light exit face are inclined planes to bend said light axis of said illumination light.

4. The projection type image display device as claimed in claim 3, wherein said light incident face and said light exit face are in parallel with each other.

5. The projection type image display device as claimed in claim 1, wherein said rod integrator is made of glass.

6. The projection type image display device as claimed in claim 2, wherein said rod integrator is made of glass.

7. The projection type image display device as claimed in claim 3, wherein said rod integrator is made of glass.

8. The projection type image display device as claimed in claim 4, wherein said rod integrator is made of glass.

* * * * *